(12) United States Patent
Ji et al.

(10) Patent No.: US 11,507,882 B2
(45) Date of Patent: Nov. 22, 2022

(54) METHOD AND DEVICE FOR OPTIMIZING TRAINING SET FOR TEXT CLASSIFICATION AND STORAGE MEDIUM

(71) Applicant: Beijing Xiaomi Intelligent Technology Co., Ltd., Beijing (CN)

(72) Inventors: Hongxu Ji, Beijing (CN); Qun Guo, Beijing (CN); Xiao Lu, Beijing (CN); Erli Meng, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 480 days.

(21) Appl. No.: 16/693,381

(22) Filed: Nov. 25, 2019

(65) Prior Publication Data

US 2021/0081832 A1 Mar. 18, 2021

(30) Foreign Application Priority Data

Sep. 12, 2019 (CN) .......................... 201910866630.X

(51) Int. Cl.
*G06N 20/00* (2019.01)
*G06F 16/35* (2019.01)
(Continued)

(52) U.S. Cl.
CPC ............. *G06N 20/00* (2019.01); *G06F 16/35* (2019.01); *G06F 40/30* (2020.01); *G06K 9/6256* (2013.01);
(Continued)

(58) Field of Classification Search
CPC ........ G06N 20/00; G06N 3/0454; G06N 3/08; G06N 99/005; G06F 16/35; G06F 40/30;
(Continued)

(56) References Cited

U.S. PATENT DOCUMENTS 10,108,902 B1 10/2018 Lockett
2007/0219776 A1* 9/2007 Gamon ................... G06F 40/20
704/9
(Continued)

FOREIGN PATENT DOCUMENTS

CN 101196904 A 6/2008
CN 105320957 A 2/2016
(Continued)

OTHER PUBLICATIONS

Zhang Zhijun,"Construction of Bayesian Network Classifier", Research on the Application of Big Data Technology in Universities>,issued on Sep. 30, 2017 pp. 245-247.
(Continued)

*Primary Examiner* — Yogeshkumar Patel
(74) *Attorney, Agent, or Firm* — Syncoda LLC; Feng Ma

(57) ABSTRACT

A method for optimizing a training set for text classification includes: the training set for text classification is acquired; part of samples are selected from the training set as a first initial training subset, and an incorrectly tagged sample in the first initial training subset is corrected to obtain a second initial training subset; a text classification model is trained according to the second initial training subset; the samples in the training set are predicted by the trained text classification model to obtain a prediction result; an incorrectly tagged sample set is generated according to the prediction result; a key incorrectly tagged sample is selected from the incorrectly tagged sample set, and a tag of the key incorrectly tagged sample is corrected to generate a correctly tagged sample corresponding to the key incorrectly tagged sample; and the training set is updated by using the correctly tagged sample.

18 Claims, 5 Drawing Sheets

(51) Int. Cl.
*G06F 40/30* (2020.01)
*G06K 9/62* (2022.01)
*G06N 3/04* (2006.01)
*G06N 3/08* (2006.01)

(52) U.S. Cl.
CPC .......... *G06K 9/6269* (2013.01); *G06N 3/0454* (2013.01); *G06N 3/08* (2013.01)

(58) Field of Classification Search
CPC ...... G06F 40/20; G06F 16/355; G06F 40/232; G06F 40/253; G06F 16/3329; G06K 9/6256; G06K 9/6269; G06K 9/6268; G10L 15/197; G10L 15/183
See application file for complete search history.

(56) References Cited

U.S. PATENT DOCUMENTS

| | | | | |
|---|---|---|---|---|
| 2008/0103996 | A1* | 5/2008 | Forman | G06N 20/00 706/12 |
| 2010/0257440 | A1 | 10/2010 | Kshirsagar | |
| 2012/0131015 | A1* | 5/2012 | Al Badrashiny | G06F 40/253 707/E17.084 |
| 2018/0018576 | A1* | 1/2018 | Boyer | G06F 16/355 |
| 2019/0034822 | A1* | 1/2019 | Farré Guiu | G06K 9/6259 |

FOREIGN PATENT DOCUMENTS

| | | |
|---|---|---|
| CN | 106295637 A | 1/2017 |
| CN | 106649844 A | 5/2017 |
| CN | 107169001 A | 9/2017 |
| CN | 108416364 A | 8/2018 |
| CN | 108460015 A | 8/2018 |
| CN | 108875821 A | 11/2018 |
| CN | 109543713 A | 3/2019 |
| CN | 109583332 A | 4/2019 |
| CN | 109614492 A | 4/2019 |
| CN | 109635110 A | 4/2019 |
| CN | 109918642 A | 6/2019 |
| CN | 110188197 A | 8/2019 |

OTHER PUBLICATIONS

Supplementary European Search Report in the European application No. 19214350.1, dated Jun. 17, 2020.

* cited by examiner

METHOD AND DEVICE FOR OPTIMIZING TRAINING SET FOR TEXT CLASSIFICATION AND STORAGE MEDIUM

CROSS-REFERENCE TO RELATED APPLICATION

This application claims priority to Chinese patent application No. 201910866630.X filed on Sep. 12, 2019, the disclosure of which is hereby incorporated by reference in its entirety.

BACKGROUND

A text classification algorithm is an important algorithm in the field of natural language processing. A classification effect of the algorithm is closely related to data quality and sample number of a training set. When incorrectly tagged samples exist in the training set or the training set does not have enough tagged samples, performance of the algorithm can be affected.

SUMMARY

The present disclosure generally relates to the field of text classification, and more particularly, to a method and device for optimizing a training set for text classification.

According to a first aspect of embodiments of the present disclosure, a method for optimizing a training set for text classification is provided, which may include: the training set for text classification is acquired; part of samples are selected from the training set as a first initial training subset, and an incorrectly tagged sample in the first initial training subset is corrected to obtain a second initial training subset; a text classification model is trained according to the second initial training subset; the samples in the training set are predicted by the trained text classification model to obtain a prediction result; an incorrectly tagged sample set is generated according to the prediction result; a key incorrectly tagged sample is selected from the incorrectly tagged sample set, and a tag of the key incorrectly tagged sample is corrected to generate a correctly tagged sample corresponding to the key incorrectly tagged sample; and the training set is updated by using the correctly tagged sample.

In some embodiments, the operation that part of the samples are selected from the training set as the first initial training subset and the incorrectly tagged sample in the first initial training subset is corrected to obtain the second initial training subset may include: part of the samples are randomly selected from the training set by a random extraction function as the first initial training subset, and the incorrectly tagged sample in the first initial training subset is manually corrected to obtain the second initial training subset.

In some embodiments, the operation that the samples in the training set are predicted by the trained text classification model to obtain the prediction result may include: a classifier for text classification is constructed according to the trained text classification model; and the samples in the training set are predicted by the classifier to obtain the prediction result.

In some embodiments, the operation that the incorrectly tagged sample set is generated according to the prediction result may include: an incorrectly tagged sample is selected according to a confusion matrix of the prediction result to generate the incorrectly tagged sample set.

In some embodiments, the operation that the key incorrectly tagged sample is selected from the incorrectly tagged sample set and the tag of the key incorrectly tagged sample is corrected to generate the correctly tagged sample may include: segmentation is performed on the sample in the incorrectly tagged sample set to form a term list; a characteristic value of each term in the term list is determined, and first k terms are extracted as key terms to form a key term library, terms in the term list are ranked according to characteristic values, k is a natural number more than or equal to 1; a key incorrectly tagged sample including at least one of the key terms is selected from the incorrectly tagged sample set according to the key term library; and the tag of the key incorrectly tagged sample is corrected to generate the correctly tagged sample. In an example, the characteristic value of each word in the term list may be calculated according to the term list through a chi-square test algorithm and an information gain algorithm.

In some embodiments, the method may further include: a keyword is selected from the incorrectly tagged sample set, and data enhancement is performed on the keyword to generate a new sample; and the new sample is tagged, and the tagged new sample is added into the training set.

In some embodiments, the operation that the keyword is selected from the incorrectly tagged sample set and data enhancement is performed on the keyword to generate the new sample may include: a word is extracted from the incorrectly tagged sample set by an n-gram model to form a word set; a co-occurrence matrix of the word and a category of the word is generated according to the word set; a characteristic value of each word in the word set is calculated according to the co-occurrence matrix, and first x words and last y words in the word set are extracted as keywords to form a keyword library, words in the word set are ranked according to characteristic values, x and y are natural numbers more than or equal to 1; and data enhancement is performed on the keywords in the keyword library to generate new samples. In an example, the characteristic value of each word in the word set may be calculated, for example, according to the co-occurrence matrix through a Term Frequency-Inverse Document Frequency (DF-IDF) algorithm and a BM25 algorithm.

In some embodiments, the operation that the word is extracted from the incorrectly tagged sample set by the n-gram model may include: the word is extracted from the incorrectly tagged sample set by a 1-gram model, a 2-gram model and a 3-gram model respectively.

According to a second aspect of the embodiments of the present disclosure, a device for optimizing a training set for text classification is provided, which may include: a processor; and a memory configured to store an instruction executable for the processor, wherein the processor is configured to: acquire the training set for text classification; select part of samples from the training set as a first initial training subset and correct an incorrectly tagged sample in the first initial training subset to obtain a second initial training subset; train a text classification model according to the second initial training subset; predict the samples in the training set by the trained text classification model to obtain a prediction result; generate an incorrectly tagged sample set according to the prediction result; select a key incorrectly tagged sample from the incorrectly tagged sample set and correct a tag of the key incorrectly tagged sample to generate a correctly tagged sample corresponding to the key incorrectly tagged sample; and update the training set by using the correctly tagged sample.

In some embodiments, the processor is further configured to: randomly select part of the samples from the training set by a random extraction function as the first initial training subset, and manually correct the incorrectly tagged sample in the first initial training subset to obtain the second initial training subset.

In some embodiments, the processor is further configured to construct a classifier for text classification according to the trained text classification model; and predict the samples in the training set by the classifier to obtain the prediction result.

In some embodiments, the processor is further configured to select an incorrectly tagged sample according to a confusion matrix of the prediction result to generate the incorrectly tagged sample set.

In some embodiments, the processor is further configured to: perform segmentation on the sample in the incorrectly tagged sample set to form a term list; determine a characteristic value of each term in the term list, and extract first k terms as key terms to form a key term library, terms in the term list are ranked according to characteristic values, k is a natural number more than or equal to 1; select a key incorrectly tagged sample including at least one of the key terms from the incorrectly tagged sample set according to the key term library; and correct the tag of the key incorrectly tagged sample to generate the correctly tagged sample.

In some embodiments, the processor is further configured to: select a keyword from the incorrectly tagged sample set and perform data enhancement on the keyword to generate a new sample; and tag the new sample and add the tagged new sample into the training set.

In some embodiments, the processor is further configured to: extract a word from the incorrectly tagged sample set by an n-gram model to form a word set; generate a co-occurrence matrix of the word and a category of the word according to the word set; calculate a characteristic value of each word in the word set according to the co-occurrence matrix, and first x words and last y words in the word set are extracted as keywords to form a keyword library, words in the word set are ranked according to characteristic values, x and y are natural numbers more than or equal to 1; and perform data enhancement on the keywords in the keyword library to generate new samples.

In some embodiments, the operation that the word is extracted from the incorrectly tagged sample set by the n-gram model may include: the word is extracted from the incorrectly tagged sample set by a 1-gram model, a 2-gram model and a 3-gram model respectively.

According to a third aspect of the embodiments of the present disclosure, a non-transitory computer-readable storage medium is provided, instructions in the storage medium are executed by a processor of a server to enable the server to execute the method for optimizing a training set for text classification involved in the first aspect or any aspect in the first aspect.

It is to be understood that the above general descriptions and the detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
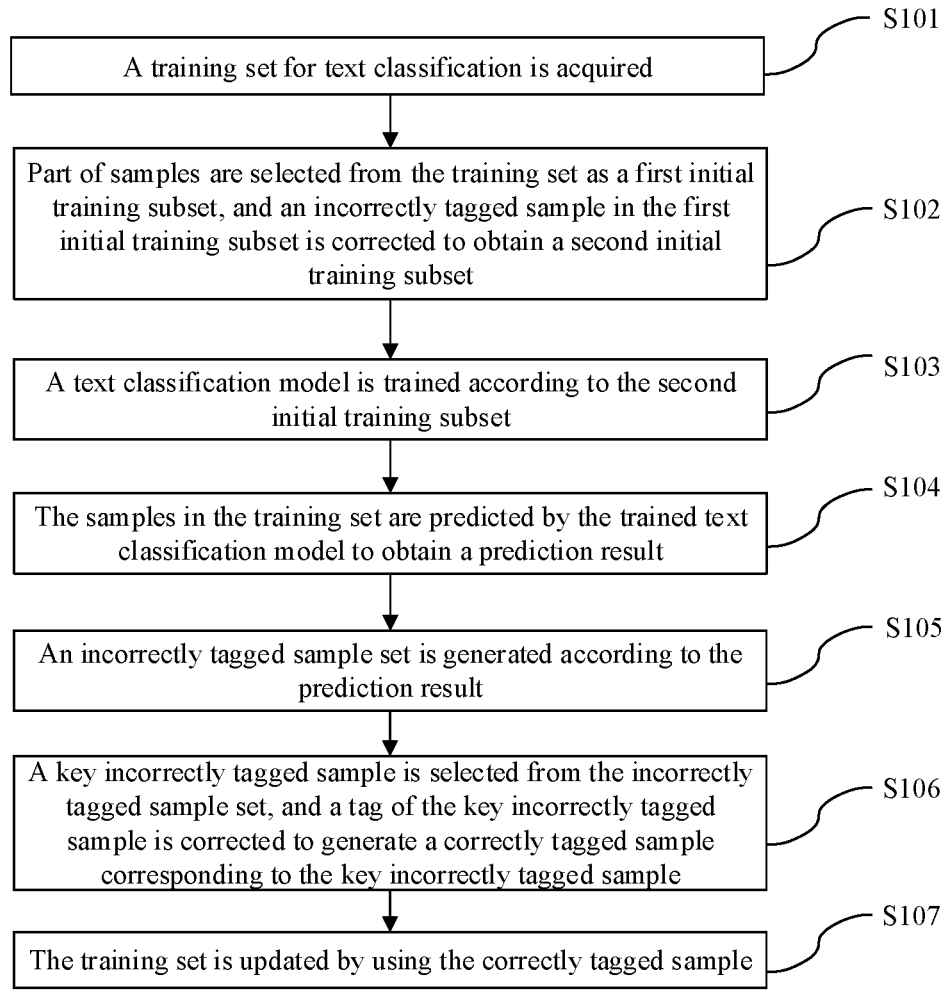
FIG. 1 is a flowchart showing a method for optimizing a training set for text classification, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

At present, the training set is extended by manually increasing the number of tagged samples, or quality of the training set is improved by manually correcting wrong tagged samples in the training set. However, if samples are randomly selected for tagging when the training set is extended, a large number of samples to be tagged may increase manual tagging cost and prolong model training time, and incorrectly tagged samples may not be found.

Part of samples which have larger amounts of information and are more effective may usually be screened for manual tagging by using an active learning method. By such a method, the training set is extended and part of high-quality tagged samples are added, so that a model may have a relatively good classification effect. However, incorrectly tagged samples in the training set may also not be picked out by conventional active learning method.

On the other hand, data enhancement in the field of text classification mainly includes synonym replacement, random insertion/exchange/deletion, cross translation, context-prediction-based replacement and the like. However, these enhancement manners are general enhancement manners and may only be applied to scenarios without enough data, data noises may not be corrected or the model may not learn information except training data, and performance improvement of the classification model are limited.

Various embodiments of the present disclosure provides a method for optimizing a training set for text classification. More specifically, the training set for text classification is optimized by using an active learning method.

FIG. 1 is a flowchart showing a method for optimizing a training set for text classification, according to some embodiments of the present disclosure. As shown in FIG. 1, the method for optimizing the training set for text classification includes the following operations S101 to S107.

In S101, a training set for text classification is acquired. According to the embodiment of the present disclosure, the training set for a text classification model is acquired, and all text samples in the training set have been tagged.

In S102, some of the samples are selected from the training set as a first initial training subset, and an incorrectly tagged sample in the first initial training subset is corrected to obtain a second initial training subset. In S103, a text classification model is trained according to the second initial training subset. According to the embodiment of the present disclosure, the text classification model is trained according to the second initial training subset. For example, a TextCNN model is trained to obtain the trained text classification model. In another embodiment, a Bert pretraining model is used, and fine adjustment is performed for a classification task to obtain a preliminary training model.

In S104, the samples in the training set are predicted by the trained text classification model to obtain a prediction result. According to the embodiment of the present disclosure, all the text samples in the training set are predicted by the trained text classification model to obtain the prediction result. In another embodiment, the other samples in the training set, except the first initial training subset, may also be predicted.

In S105, an incorrectly tagged sample set is generated according to the prediction result. According to the embodiment of the present disclosure, the set of all incorrectly tagged samples is constructed according to the prediction result.

In S106, a key incorrectly tagged sample is selected from the incorrectly tagged sample set, and a tag of the key incorrectly tagged sample is corrected to generate a correctly tagged sample corresponding to the key incorrectly tagged sample. According to the embodiment of the present disclosure, the key incorrectly tagged sample is selected from the set of all the incorrectly tagged samples, and the tag of the key incorrectly tagged sample is corrected to correct the key incorrectly tagged sample into the correctly tagged sample.

In S107, the training set is updated by using the correctly tagged sample. According to the embodiment of the present disclosure, the original sample in the training set is replaced with the correctly tagged sample.

Of course, the method may return to S101 to continue execution of S101 after S107 is executed, and the text classification model is repeatedly iterated by using the training set in which more correctly tagged samples are updated until the text classification model has a good classification effect. It is to be noted that the number of iterations may specifically be determined by those skilled in the art according to a requirement of an application scenario. In some embodiments, a certain number of samples may be randomly selected by using a method of sampling the training set, and when a correct data tagging ratio exceeds a predetermined threshold value, it may be considered that iteration is completed.

According to some embodiments of the present disclosure, the operation that part of the samples are selected from the training set as the first initial training subset and the incorrectly tagged sample in the first initial training subset is corrected to obtain the second initial training subset includes the following operations: part of the samples are randomly selected from the training set by a random extraction function as the first initial training subset, and the incorrectly tagged sample in the first initial training subset is manually corrected to obtain the second initial training subset. In the embodiment, a small part of the text samples are randomly selected from the training set by the random extraction function such as Random( ) as the first initial training subset, and incorrect tags of all the text samples in the first initial training subset are manually corrected to obtain a corrected text sample set as the second initial training subset.

According to some embodiments of the present disclosure, the operation that the samples in the training set are predicted by the trained text classification model to obtain the prediction result includes the following operations: a classifier for text classification is constructed according to the trained text classification model; and the samples in the training set are predicted by the classifier to obtain the prediction result. In the embodiment, a classifier for binary text classification is constructed according to the trained text classification model and a known method; and all the text samples in the training set are predicted by the classifier for binary classification to obtain the prediction result.

According to some embodiments of the present disclosure, the operation that the incorrectly tagged sample set is generated according to the prediction result includes the following operations: an incorrectly tagged sample is selected according to a confusion matrix of the prediction result to generate the incorrectly tagged sample set. In the embodiment, the incorrectly tagged sample is selected according to the confusion matrix of the prediction result. For example, for a binary classification problem, a sample of which a negative class is predicted to be a positive class (False Positive (FP)) and a sample of which the positive class is predicted to be the negative class (False Negative (FN)) may be selected to generate the incorrectly tagged sample set.

According to some embodiments of the present disclosure, the operation that the key incorrectly tagged sample is selected from the incorrectly tagged sample set and the tag of the key incorrectly tagged sample is corrected to generate the correctly tagged sample includes the following operations: segmentation is performed on the sample in the incorrectly tagged sample set to form a term list; a characteristic value of each term in the term list is determined, and first k terms are extracted as key terms to form a key term library, terms in the term list are ranked according to the characteristic values, k is a natural number more than or equal to 1; a key incorrectly tagged sample including at least one of the key terms is selected from the incorrectly tagged sample set according to the key term library; and the tag of the key incorrectly tagged sample is corrected to generate the correctly tagged sample. In some embodiments, the characteristic value of each word in the term list may be calculated, for example, according to the term list through a chi-square test algorithm and an information gain algorithm.

In the embodiments, segmentation may be performed on the sample in the incorrectly tagged sample set through a known segmentation method (for example, jieba), and the term list is formed through a statistical method, the term list includes frequency information that each term in the term list is occurred in the incorrectly tagged sample set and frequency information that each term in the term list is occurred in different categories (for example, financial and sports) of samples in the incorrectly tagged sample set respectively; the characteristic value of each term in the term list is calculated according to the term list through the chi-square algorithm and the information gain algorithm respectively, the characteristic value represents relevance between the term and different categories (for example, financial and sports), and in combination with the characteristic values obtained by the two algorithms, the terms of which the relevance is ranked at the first k positions (for example, the first five positions) are extracted as the key terms to form the key term library, k is a natural number more than or equal to 1, for example, k=5; the key incorrectly tagged sample including at least one of the key terms is selected from the incorrectly tagged sample set; and the tag of the key incorrectly tagged sample is corrected to generate the correctly tagged sample.

According to the embodiment of the present disclosure, for the problem that relatively many incorrectly tagged samples exist in the training set, an incorrectly tagged sample selection strategy is proposed based on an active learning method. All incorrectly tagged samples in the tagged training set may be determined through the confusion matrix of the prediction result and a text characteristic mining algorithm, only small part of key incorrectly tagged samples may be selected from all the incorrectly tagged samples, and then only the small part of key incorrectly tagged samples are required to be manually re-tagged. In such a manner, small-scale incorrect data is manually tagged, rapidly iteratively correction is performed on the premise of ensuring low labor cost, and iteration ending time is automatically determined, so that the problems that incorrectly tagged samples may not be automatically determined in an existing active learning method and manual tagging cost is excessively high under the circumstance that there are excessive incorrectly tagged samples are solved.

Figure 2:
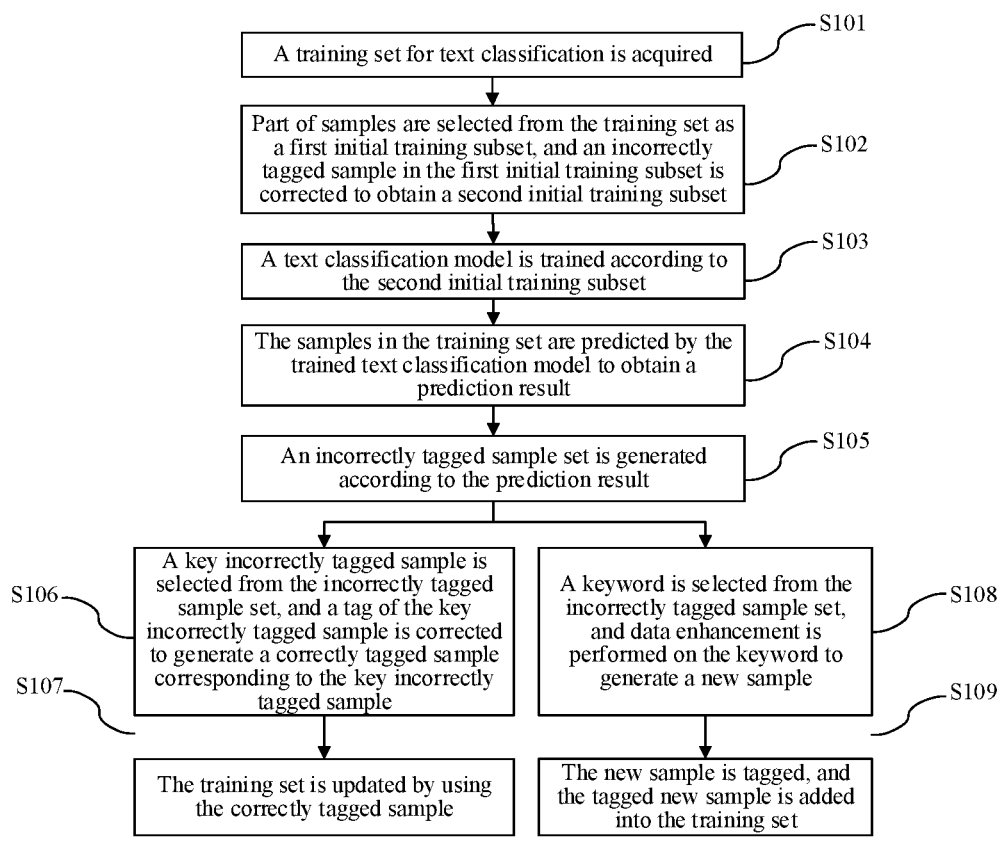
FIG. 2 is a flowchart showing another method for optimizing a training set for text classification, according to some embodiments of the present disclosure.

FIG. 2 is a flowchart showing another method for optimizing a training set for text classification, according to some embodiments of the present disclosure. As shown in FIG. 2, the method further includes the following operations S108 to S109. In S108, a keyword is selected from the incorrectly tagged sample set, and data enhancement is performed on the keyword to generate a new sample. In S109, the new sample is tagged, and the tagged new sample is added into the training set.

In some embodiments, the keyword is selected from the incorrectly tagged sample set, and data enhancement is performed on the keyword to generate the new sample. Moreover, the new sample is tagged, and the tagged new sample is added into the training set.

Of course, the method may return to S101 to continue execution of S101 after S109 is executed, and the text classification model is repeatedly iterated by using the extended training set until the text classification model has a good classification effect. In addition, incorrect tags in the extended training set are corrected through the abovementioned method, so that correction of the incorrectly tagged sample in the training set may be combined with extension of the training set to optimize the training set better.

According to some embodiments of the present disclosure, the operation that the keyword is selected from the incorrectly tagged sample set and data enhancement is performed on the keyword to generate the new sample includes the following operations: a word is extracted from the incorrectly tagged sample set by an n-gram model to form a word set; a co-occurrence matrix of the word and a category of the word is generated according to the word set; a characteristic value of each word in the word set is calculated according to the co-occurrence matrix, and first x words and last y words in the word set are extracted as key words to form a keyword library, words in the word set are ranked according to the characteristic value, x and y are natural numbers more than or equal to 1 and x is equal to y or x is unequal to y; and data enhancement is performed on the keywords in the keyword library to generate new samples. In some embodiments, the characteristic value of each word in the word set may be calculated, for example, according to the co-occurrence matrix through a TF-IDF algorithm and a BM25 algorithm.

In some embodiments, words are extracted from all the samples in the incorrectly tagged sample set by the n-gram model to form the word set; the co-occurrence matrix of the word and the category (for example, financial and sports) of the word is generated through a statistical algorithm according to the word set, the co-occurrence matrix includes frequency information that each word in the co-occurrence matrix is occurred in the incorrectly tagged sample set, frequency information that each word in the co-occurrence matrix is occurred in different categories (for example, financial and sports) of samples in the incorrectly tagged sample set respectively and the number of the categories; the characteristic value of each word in the word set is calculated according to the co-occurrence matrix through the TF-IDF algorithm and the BM25 algorithm respectively, the characteristic value represents relevance between the word and different categories (for example, financial and sports), and in combination with the characteristic values obtained by the two algorithms, the words of which the relevance is ranked at the first x positions (for example, the first five positions) and the last y positions (for example, the last five positions) are extracted as the keywords to form the keyword library, x and y are natural numbers more than or equal to 1 and x is equal to y or x is unequal to y; and data enhancement is performed on the keyword in the keyword library through any applicable known data enhancement algorithm to generate the new sample.

According to some embodiments of the present disclosure, the operation that the word is extracted from the incorrectly tagged sample set by the n-gram model includes the following operations: the word is extracted from the incorrectly tagged sample set by a 1-gram model, a 2-gram model and a 3-gram model respectively. In the embodiment, one-letter, two-letter and three-letter words are extracted from the incorrectly tagged sample set by the 1-gram model, the 2-gram model and the 3-gram model respectively.

According to the embodiment of the present disclosure, for the problem of unbalanced tagged samples in the training set, samples incorrectly judged by the classifier in the confusion matrix are analyzed by using the active learning method and the data enhancement algorithm, and for unbalanced categories and the samples incorrectly predicted by the classifier, key text characteristics with high contribution degrees are selected by using the TF-IDF and the BM25 algorithm, accurate data enhancement is performed on specific categories and samples to increase the number of samples, and the samples are added into the training set after being automatically tagged and manually tagged, so that the problem of small number of tagged samples is solved, a generalization capability of the model is improved, and a classification effect of the model in a real service scenario is directionally improved. An embodiment of the present disclosure also provides a device for optimizing a training set for text classification.

It may be understood that, for realizing the abovementioned functions, the device for optimizing a training set for text classification provided in the embodiment of the present disclosure includes hardware structures and/or software portions executing each function. In combination with portions and algorithm steps of each example disclosed in the embodiments of the present disclosure, the embodiments of the present disclosure may be implemented by hardware or a combination of the hardware and computer software. Whether a function is executed by the hardware or in a manner of driving, through the computer software, the hardware depends on specific applications and design constraints of the technical solutions. Those skilled in the art may realize the described functions for each specific application by using different methods, but such realization shall fall within the scope of the technical solutions of the embodiments of the present disclosure.

Some embodiments of the present disclosure also provide a device for optimizing a training set for text classification. The device is configured to execute the steps in the method embodiments.

Figure 3:
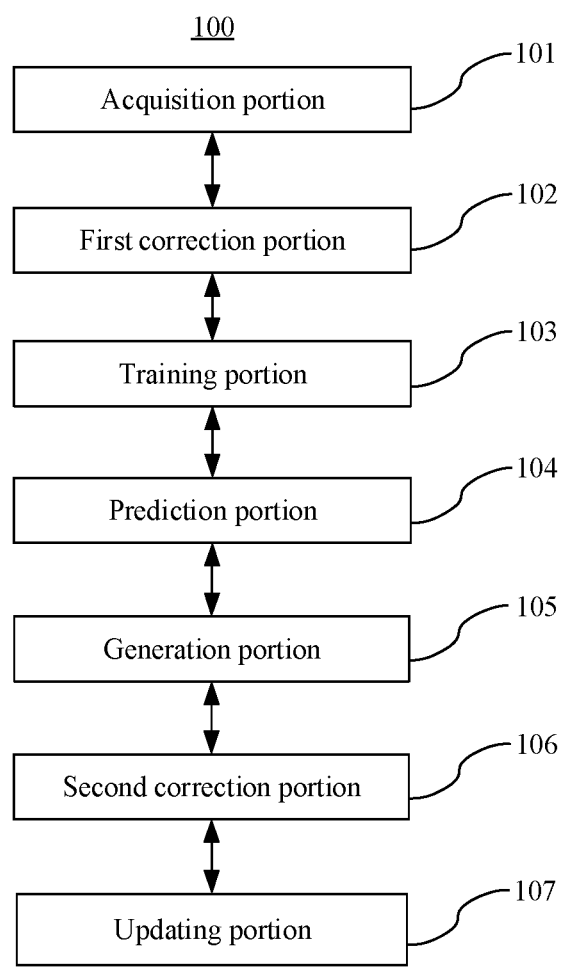
FIG. 3 is a block diagram of a device for optimizing a training set for text classification, according to some embodiments of the present disclosure.

FIG. 3 is a block diagram of a device for optimizing a training set for text classification 100, according to some embodiments of the present disclosure. As shown in FIG. 3, the device for optimizing a training set for text classification 100 includes an acquisition portion 101, a first correction portion 102, a training portion 103, a prediction portion 104, a generation portion 105, a second correction portion 106 and an updating portion 107. The acquisition portion 101 is configured to acquire the training set for text classification. The first correction portion 102 is configured to select part of samples from the training set as a first initial training subset and correct an incorrectly tagged sample in the first initial training subset to obtain a second initial training subset. The training portion 103 is configured to train a text classification model according to the second initial training subset. The prediction portion 104 is configured to predict the samples in the training set by the trained text classification model to obtain a prediction result. The generation portion 105 is configured to generate an incorrectly tagged sample set according to the prediction result. The second correction portion 106 is configured to select a key incorrectly tagged sample from the incorrectly tagged sample set and correct a tag of the key incorrectly tagged sample to generate a correctly tagged sample corresponding to the key incorrectly tagged sample. The updating portion 107 is configured to update the training set by using the correctly tagged sample.

In another aspect, the first correction portion is configured to select part of the samples from the training set as the first initial training subset and correct the incorrectly tagged sample in the first initial training subset to obtain the second initial training subset in the following manner that: part of the samples are randomly selected from the training set by a random extraction function as the first initial training subset, and the incorrectly tagged sample in the first initial training subset is manually corrected to obtain the second initial training subset.

In another aspect, the prediction portion is configured to predict the samples in the training set by the trained text classification model to obtain the prediction result in the following manner that: a classifier for text classification is constructed according to the trained text classification model; and the samples in the training set are predicted by the classifier to obtain the prediction result.

In another aspect, the generation portion is configured to generate the incorrectly tagged sample set according to the prediction result in the following manner that: an incorrectly tagged sample is selected according to a confusion matrix of the prediction result to generate the incorrectly tagged sample set.

In another aspect, the second correction portion is configured to select the key incorrectly tagged sample from the incorrectly tagged sample set and correct the tag of the key incorrectly tagged sample to generate the correctly tagged sample in the following manner: segmentation is performed on the sample in the incorrectly tagged sample set to form a term list; a characteristic value of each term in the term list is determined, and first k terms are extracted as key terms to form a key term library, terms in the term list are ranked according to characteristic values, k is a natural number more than or equal to 1; a key incorrectly tagged sample including at least one of the key terms is selected from the incorrectly tagged sample set according to the key term library; and the tag of the key incorrectly tagged sample is corrected to generate the correctly tagged sample.

Various embodiments of the present disclosure can have one or more of the following advantages. The incorrectly tagged sample can be selected based on active learning for manual tagging and then rapid iterative correction, so that quality of the training set is improved, and an effect of the text classification model can be improved. Data enhancement can be performed on the incorrectly tagged sample to add a training sample for rapid iterative correction, so that the effect of the text classification model can be improved.

Figure 4:
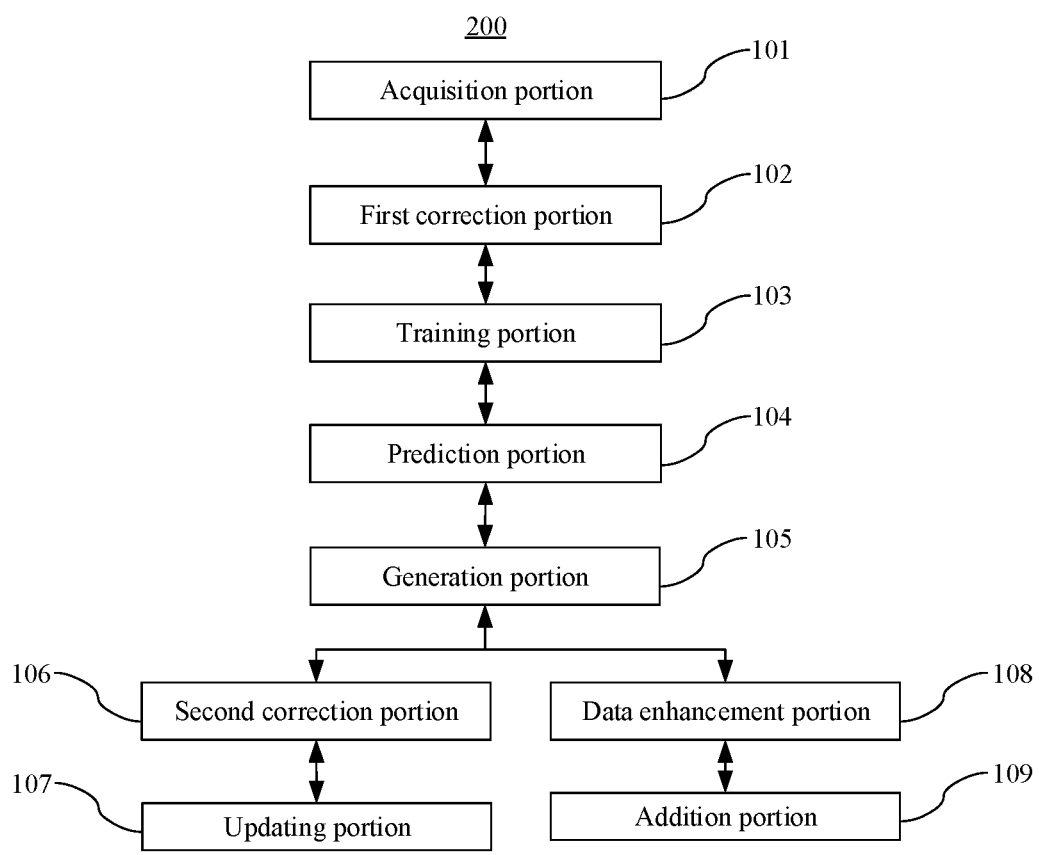
FIG. 4 is a block diagram of another device for optimizing a training set for text classification, according to some embodiments of the present disclosure.

FIG. 4 is a block diagram of another device for optimizing a training set for text classification, according to some embodiments of the present disclosure. As shown in FIG. 4, the device 200 further includes: a data enhancement portion 108, configured to select a keyword from the incorrectly tagged sample set and perform data enhancement on the keyword to generate a new sample; and an addition portion 109, configured to tag the new sample and add the tagged new sample into the training set.

In another aspect, the data enhancement portion is configured to select the keyword from the incorrectly tagged sample set and perform data enhancement on the keyword to generate the new sample in the following manner that: a word is extracted from the incorrectly tagged sample set by an n-gram model to form a word set; a co-occurrence matrix of the word and a category of the word is generated according to the word set; a characteristic value of each word in the word set is calculated according to the co-occurrence matrix, and first x words and last y words in the word set are extracted as keywords to form a keyword library, words in the word set are ranked according to characteristic values, x and y are natural numbers more than or equal to 1 and x is equal to y or x is unequal to y; and data enhancement is performed on the keywords in the keyword library to generate new samples.

In another aspect, the operation that the words are extracted from the incorrectly tagged sample set by the n-gram model includes the following operations: the word is extracted from the incorrectly tagged sample set by a 1-gram model, a 2-gram model and a 3-gram model respectively.

It may be understood that, with respect to the device in the above embodiment, the specific manners for performing operations for individual portions therein have been described in detail in the embodiment regarding the method, which will not be elaborated herein.

Figure 5:
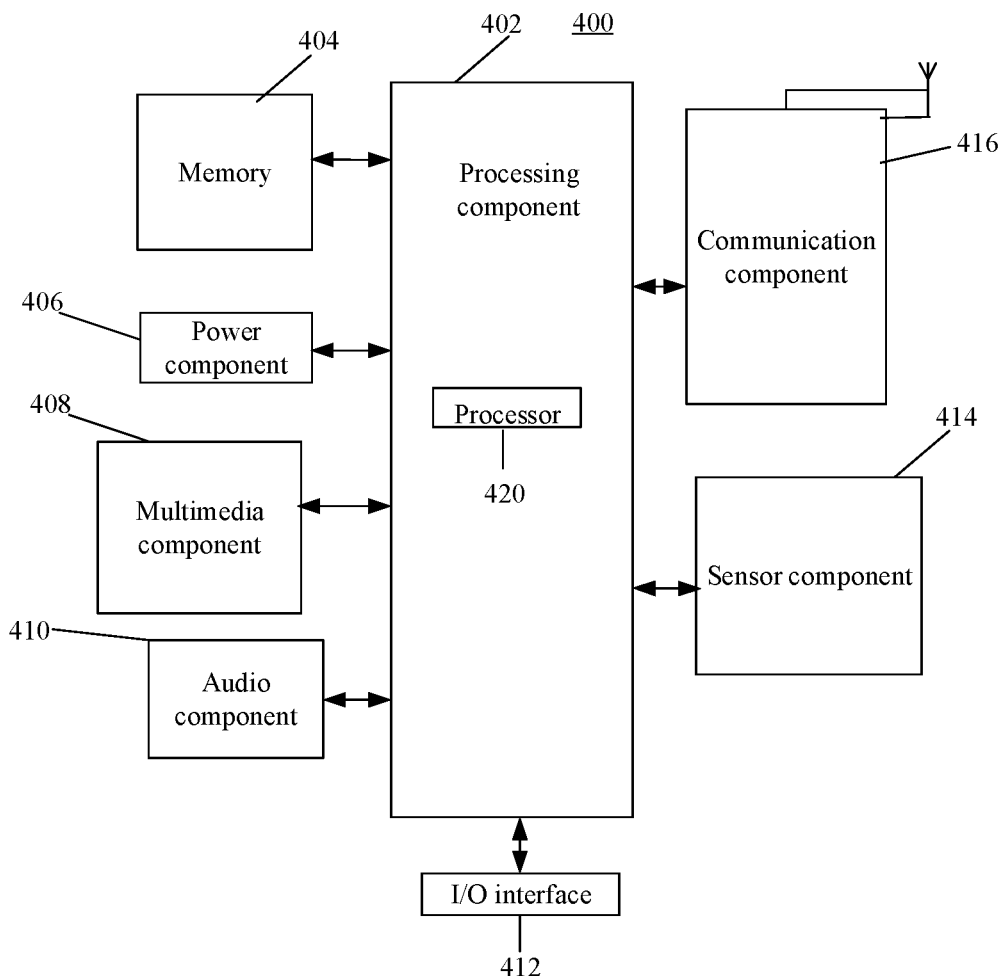
FIG. 5 is a block diagram of another device for optimizing a training set for text classification, according to some embodiments of the present disclosure.

Various embodiments of the present disclosure also provide a device for optimizing a training set for text classification. FIG. 5 is a block diagram of another device for optimizing a training set for text classification 400, according to some embodiments of the present disclosure. For example, the device 400 may be a server.

Referring to FIG. 5, the device 400 may include one or more of the following components: a processing component 402, a memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the abovementioned method. Moreover, the processing component 402 may include one or more portions which facilitate interaction between the processing component 402 and the other components. For instance, the processing component 402 may include a multimedia portion to facilitate interaction between the multimedia component 408 and the processing component 402.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 404 is configured to store various types of data to support the operation of the device 400. Examples of such data include instructions for any application programs or methods operated on the device 400, contact data, phonebook data, messages, pictures, video, etc. The memory 404 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with generation, management and distribution of power for the device 400.

The multimedia component 408 includes a screen providing an output interface between the device 400 and a user. In some embodiments, the screen may include a Liquid Crystal Display (LCD) and a Touch Panel (TP). In some embodiments, organic light-emitting diode (OLED) or other types of displays can be employed. In some embodiments, the methods discussed above can further include displaying the final or intermediate text classification results on the screen to an operator or user.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC), and the MIC is configured to receive an external audio signal when the device 400 is in the operation mode, such as a call mode, a recording mode and a voice recognition mode. The received audio signal may further be stored in the memory 404 or sent through the communication component 416. In some embodiments, the audio component 410 further includes a speaker configured to output the audio signal.

The I/O interface 412 provides an interface between the processing component 402 and a peripheral interface portion, and the peripheral interface portion may be a keyboard, a click wheel, a button and the like. The button may include, but not limited to: a home button, a volume button, a starting button and a locking button.

The sensor component 414 includes one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging APP. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and other equipment. The device 400 may access a communication-standard-based wireless network, such as a Wireless Fidelity (Wi-Fi) network, a $2^{nd}$-Generation (2G), a $3^{rd}$-Generation (3G), $4^{th}$-Generation (4G), or $5^{th}$-Generation (5G) network or a combination thereof. In some embodiments of the present disclosure, the communication component 416 receives a broadcast signal or broadcast associated information from an external broadcast management system through a broadcast channel. In some embodiments of the present disclosure, the communication component 416 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 404 including an instruction, and the instruction may be executed by the processor 420 of the device 400 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Various embodiments of the present disclosure also provide a non-transitory computer-readable storage medium having stored thereon instructions, which are executed by a processor of a server to enable the server to execute the method for optimizing a training set for text classification involved in the abovementioned embodiment.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for optimizing a training set for text classification, comprising:
    acquiring the training set for text classification;
    selecting part of samples from the training set as a first initial training subset, and correcting an incorrectly tagged sample in the first initial training subset to obtain a second initial training subset;

training a text classification model according to the second initial training subset;

predicting the samples in the training set by the trained text classification model to obtain a prediction result;

generating an incorrectly tagged sample set according to the prediction result;

selecting a key incorrectly tagged sample from the incorrectly tagged sample set, and correcting a tag of the key incorrectly tagged sample to generate a correctly tagged sample corresponding to the key incorrectly tagged sample;

updating the training set by using the correctly tagged sample;

selecting a keyword from the incorrectly tagged sample set, and performing data enhancement on the keyword to generate a new sample; and tagging the new sample, and adding the tagged new sample into the training set.

2. The method of claim 1, wherein the selecting part of the samples from the training set as the first initial training subset and correcting the incorrectly tagged sample in the first initial training subset to obtain the second initial training subset comprises:

randomly selecting part of the samples from the training set by a random extraction function as a first initial training subset, and manually correcting the incorrectly tagged sample in the first initial training subset to obtain the second initial training subset.

3. The method of claim 1, wherein the predicting the samples in the training set by the trained text classification model to obtain the prediction result comprises:

constructing a classifier for text classification according to the trained text classification model; and predicting the samples in the training set by the classifier to obtain the prediction result.

4. The method of claim 3, wherein the generating the incorrectly tagged sample set according to the prediction result comprises:

selecting an incorrectly tagged sample according to a confusion matrix of the prediction result to generate the incorrectly tagged sample set.

5. The method of claim 4, wherein the selecting the key incorrectly tagged sample from the incorrectly tagged sample set and correcting the tag of the key incorrectly tagged sample to generate the correctly tagged sample comprises:

performing segmentation on the sample in the incorrectly tagged sample set to form a term list;

determining a characteristic value of each term in the term list, and extracting first k terms as key terms to form a key term library, terms in the term list being ranked according to characteristic values, k being a natural number more than or equal to 1;

selecting a key incorrectly tagged sample comprising at least one of the key terms from the incorrectly tagged sample set according to the key term library; and correcting the tag of the key incorrectly tagged sample to generate the correctly tagged sample.

6. The method of claim 1, wherein the selecting the keyword from the incorrectly tagged sample set and performing data enhancement on the keyword to generate the new sample comprises:

extracting a word from the incorrectly tagged sample set by an n-gram model to form a word set;

generating a co-occurrence matrix of the word and a category of the word according to the word set;

calculating a characteristic value of each word in the word set according to the co-occurrence matrix, and extracting first x words and last y words in the word set as keywords to form a keyword library, words in the word set being ranked according to characteristic values, x and y being natural numbers more than or equal to 1; and performing data enhancement on the keywords in the keyword library to generate new samples.

7. The method of claim 6, wherein the extracting the word from the incorrectly tagged sample set by the n-gram model comprises:

extracting the word from the incorrectly tagged sample set by a 1-gram model, a 2-gram model and a 3-gram model respectively.

8. A device for optimizing a training set for text classification, comprising:

a processor; and a memory configured to store an instruction executable for the processor, wherein the processor is configured to:

acquire the training set for text classification;

select part of samples from the training set as a first initial training subset and correct an incorrectly tagged sample in the first initial training subset to obtain a second initial training subset;

train a text classification model according to the second initial training subset;

predict the samples in the training set by the trained text classification model to obtain a prediction result;

generate an incorrectly tagged sample set according to the prediction result;

select a key incorrectly tagged sample from the incorrectly tagged sample set and correct a tag of the key incorrectly tagged sample to generate a correctly tagged sample corresponding to the key incorrectly tagged sample;

update the training set by using the correctly tagged sample;

select a keyword from the incorrectly tagged sample set and perform data enhancement on the keyword to generate a new sample; and tag the new sample and add the tagged new sample into the training set.

9. The device of claim 8, wherein the processor is further configured to randomly select part of the samples from the training set by a random extraction function as the first initial training subset, and manually correct the incorrectly tagged sample in the first initial training subset to obtain the second initial training subset.

10. The device of claim 8, wherein the processor is further configured to construct a classifier for text classification according to the trained text classification model; and predict the samples in the training set by the classifier to obtain the prediction result.

11. The device of claim 10, wherein the processor is further configured to select an incorrectly tagged sample according to a confusion matrix of the prediction result to generate the incorrectly tagged sample set.

12. The device of claim 11, wherein the processor is further configured to:

perform segmentation on the sample in the incorrectly tagged sample set to form a term list;

determine a characteristic value of each term in the term list, and extract first k terms as key terms to form a key term library, terms in the term list being ranked according to the characteristic values, k being a natural number more than or equal to 1;

select a key incorrectly tagged sample comprising at least one of the key terms from the incorrectly tagged sample set according to the key term library; and correct the tag of the key incorrectly tagged sample to generate the correctly tagged sample.

13. The device of claim 8, wherein the processor is further configured to:

extract a word from the incorrectly tagged sample set by an n-gram model to form a word set;

generate a co-occurrence matrix of the word and a category of the word according to the word set;

calculate a characteristic value of each word in the word set according to the co-occurrence matrix, and extract first x words and last y words in the word set as keywords to form a keyword library, words in the word set being ranked according to characteristic values, x and y being natural numbers more than or equal to 1; and perform data enhancement on the keywords in the keyword library to generate new samples.

14. The device of claim 13, wherein the processor is further configured to: extract the word from the incorrectly tagged sample set by a 1-gram model, a 2-gram model and a 3-gram model respectively.

15. A non-transitory computer-readable storage medium having stored thereon instructions, which is executed by a processor of a server to enable the server to execute the following operations:

acquiring the training set for text classification;

selecting part of samples from the training set as a first initial training subset, and correcting an incorrectly tagged sample in the first initial training subset to obtain a second initial training subset;

training a text classification model according to the second initial training subset;

predicting the samples in the training set by the trained text classification model to obtain a prediction result;

generating an incorrectly tagged sample set according to the prediction result;

selecting a key incorrectly tagged sample from the incorrectly tagged sample set, and correcting a tag of the key incorrectly tagged sample to generate a correctly tagged sample corresponding to the key incorrectly tagged sample;

updating the training set by using the correctly tagged sample;

selecting a keyword from the incorrectly tagged sample set, and performing data enhancement on the keyword to generate a new sample; and tagging the new sample, and adding the tagged new sample into the training set.

16. The non-transitory computer-readable storage medium of claim 15, wherein the selecting part of the samples from the training set as the first initial training subset and correcting the incorrectly tagged sample in the first initial training subset to obtain the second initial training subset comprises:

randomly selecting part of the samples from the training set by a random extraction function as a first initial training subset, and manually correcting the incorrectly tagged sample in the first initial training subset to obtain the second initial training subset.

17. The non-transitory computer-readable storage medium of claim 15, wherein the predicting the samples in the training set by the trained text classification model to obtain the prediction result comprises:

constructing a classifier for text classification according to the trained text classification model; and predicting the samples in the training set by the classifier to obtain the prediction result.

18. The non-transitory computer-readable storage medium of claim 15, wherein the generating the incorrectly tagged sample set according to the prediction result comprises:

selecting an incorrectly tagged sample according to a confusion matrix of the prediction result to generate the incorrectly tagged sample set.

* * * * *